United States Patent [19]
Brown, III et al.

[11] Patent Number: 6,038,636
[45] Date of Patent: Mar. 14, 2000

[54] METHOD AND APPARATUS FOR RECLAIMING AND DEFRAGMENTING A FLASH MEMORY DEVICE

[75] Inventors: John Knox Brown, III, Lexington; Matthew Scott Keith, Georgetown, both of Ky.

[73] Assignee: Lexmark International, Inc., Lexington, Ky.

[21] Appl. No.: 09/067,495

[22] Filed: Apr. 27, 1998

[51] Int. Cl.[7] .................................................. G06F 12/02
[52] U.S. Cl. ........................ 711/103; 711/165; 711/133; 711/170
[58] Field of Search .................................. 711/103, 159, 711/104, 102, 139, 165, 133, 170

[56] References Cited

U.S. PATENT DOCUMENTS

| | | | |
|---|---|---|---|
| 3,805,252 | 4/1974 | Morris et al. | 340/172.5 |
| 3,810,109 | 5/1974 | Morris et al. | 340/172.5 |
| 4,048,625 | 9/1977 | Harris | 364/900 |
| 5,233,683 | 8/1993 | Sasaki | 395/110 |
| 5,239,621 | 8/1993 | Brown | 395/115 |
| 5,268,870 | 12/1993 | Harari | 365/218 |
| 5,297,148 | 3/1994 | Harari | 371/10.2 |
| 5,337,275 | 8/1994 | Garner | 365/189.01 |
| 5,341,339 | 8/1994 | Wells | 365/218 |
| 5,357,475 | 10/1994 | Hasbun | 365/218 |
| 5,418,752 | 5/1995 | Harari | 365/218 |
| 5,473,753 | 12/1995 | Wells | 395/182.03 |
| 5,491,809 | 2/1996 | Coffman | 395/430 |
| 5,502,797 | 3/1996 | Bush | 395/115 |
| 5,566,314 | 10/1996 | DeMarco | 395/430 |
| 5,577,243 | 11/1996 | Sherwood | 395/607 |
| 5,581,723 | 12/1996 | Hasbun | 395/430 |
| 5,586,285 | 12/1996 | Hasbun | 395/430 |
| 5,592,669 | 1/1997 | Robinson | 395/622 |
| 5,634,050 | 5/1997 | Krueger | 395/616 |
| 5,640,529 | 6/1997 | Hasbun | 395/430 |
| 5,671,229 | 9/1997 | Harari | 371/10.2 |
| 5,671,388 | 9/1997 | Hasbun | 711/103 |
| 5,673,383 | 9/1997 | Sukegawa | 395/182.06 |
| 5,687,345 | 11/1997 | Matsubara | 395/430 |
| 5,720,015 | 2/1998 | Martin | 395/114 |
| 5,740,395 | 4/1998 | Wells | 395/430 |
| 5,778,392 | 7/1998 | Stockman et al. | 707/205 |
| 5,819,015 | 10/1998 | Martin et al. | 395/114 |
| 5,832,493 | 11/1998 | Marshall et al. | 707/101 |
| 5,847,998 | 12/1998 | Van Buskirk | 365/185.33 |
| 5,860,082 | 1/1999 | Smith et al. | 711/103 |

*Primary Examiner*—John W. Cabeca
*Assistant Examiner*—Fred F. Tzeng
*Attorney, Agent, or Firm*—Dinsmore & Shohl, LLP; D. Brent Lambert

[57] ABSTRACT

A method and apparatus for reclaiming space on a flash memory device is provided in which valid data is copied from an individually erasable sector on the flash device to a designated memory location. The sector is then formatted or erased and the valid data is returned to the flash device at the next available free space contiguously. A pointer is updated to keep track of the location of the next available recently formatted free space on the flash device. The process is then repeated on each consecutive sector on the flash memory device until all valid data becomes contiguous on one contiguous segment of the device and all free space becomes contiguous on a second contiguous segment of the device. In this manner, the flash memory is defragmented and the largest possible contiguous file can be written to the device. Files can be saved on the flash memory device in contiguous file formats and blocked file formats. During the reclamation and defragmentation routine, the file format of the valid data is preserved. Also, file blocks on a sector which are originally non-contiguous become contiguous after the routine is performed.

20 Claims, 9 Drawing Sheets

FIG. 2

| SECTOR | BLOCK 40 | 42 | 44 | 46 | 48 | 50 | 52 | 54 |
|---|---|---|---|---|---|---|---|---|
| 30 | FILE STRUCTURE HEADER 60 | BLOCK ALLOCATION BITMAP 62 | BLOCK FILE 1 HEADER 63 | FILE 1 DATA 1 64 | FILE 1 DATA 2 66 | CONTIG FILE 2 HEADER 68 | FILE 2 DATA 70 | FILE 1 DATA 3 80 |
| 32 | FILE 2 DATA (CONTINUED) 70 | | | BLOCK FILE 3 HEADER 72 | FILE 3 DATA 1 74 | FILE 3 DATA 2 76 | FILE 3 DATA 3 78 | 9_ |
| 34 | BLOCK FILE 4 HEADER 82 | FILE 4 DATA 1 84 | FILE 4 DATA 2 86 | FILE 4 DATA 3 88 | CONTIG FILE 5 HEADER 90 | FILE 5 DATA | | |
| 36 | FILE 1 DATA 94 | FILE 1 DATA 5 96 | BLOCK FILE 6 HEADER 98 | FILE 6 DATA 1 100 | NEXT AVAILABLE FREE SPACE 102 | | | |

| SECTOR | BLOCK 40 | 42 | 44 | 46 | 48 | 50 | 52 | 54 |
|---|---|---|---|---|---|---|---|---|
| 30 | FILE STRUCTURE HEADER 60 | BLOCK ALLOCATION BITMAP 62 | BLOCK FILE 1 HEADER 63 | FILE 1 DATA 1 64 | FILE 1 DATA 2 66 | CONTIG FILE 2 HEADER 68 | FILE 2 DATA 70 | FILE 4 DATA 3 88 |
| 32 | FILE 2 DATA (CONTINUED) | | | FILE 1 DATA 3 80 | BLOCK FILE HEADER 82 | FILE 4 DATA 1 84 | FILE 4 DATA 86 | |
| 34 | FILE 1 DATA 94 | FILE 1 DATA 5 96 | BLOCK FILE HEADER 98 | FILE 6 DATA 1 100 | NEXT AVAILABLE FREE SPACE 102 | | | |
| 36 | FREE SPACE CONTINUED 102 | | | | | | | |

20

METHOD AND APPARATUS FOR RECLAIMING AND DEFRAGMENTING A FLASH MEMORY DEVICE

TECHNICAL FIELD OF THE INVENTION

The present invention relates generally to a method and apparatus for reclaiming space in a flash memory, and, more particularly, to a method and apparatus wherein the reclaiming process occurs on a block-by-block basis to the entire flash memory device, wherein the active files of the memory are defragmented during the operation, and wherein contiguous files remain in a contiguous format after the reclamation/defragmentation process

BACKGROUND OF THE INVENTION

It has become common to use a flash Electrically-Erasable Programmable Read-Only Memory (flash "EEPROM") as long-term memory in computers, printers and other devices. These memories reduce the need for separate magnetic disk drives, which can be bulky, expensive, and subject to breakdown.

A flash EEPROM includes a large plurality of floating-gate field effect transistors arranged as memory cells in typical row and column format and includes circuitry for accessing the cells and placing the transistors in one of two memory conditions. These memory devices retain information even when power is removed and can be erased electrically while in place within the system with which they are used, and therefore, can be used as a long-term memory.

One disadvantage of a flash EEPROM in comparison to a hard disk is that the flash EEPROM must be erased before it can be reprogrammed, while the electromechanical hard disk can re-write the same area of a disk when information changes by changing the magnetic field stored in the area. Thus, when a file which is stored in a flash EEPROM changes, the changed information is written to a new block on an available circuit rather than written over the old data, and the old data is marked unavailable, invalid, or deleted, such as by changing a bit in the file header.

Because a flash EEPROM cannot be reprogrammed until it has been erased, valid information that remains on the device must be rewritten to some other memory area each time the EEPROM is to be erased in order for the valid information to be preserved. Otherwise, this valid information will be erased along with the invalid or unavailable information in the flash memory.

Until recently, flash EEPROMs had to be erased all at one time (i.e., portions of the EEPROM could not be erased separately from other portions of the EEPROM). With these types of flash EEPROMs, the EEPROM is erased by applying a high voltage simultaneously to the source terminals to all of the transistors (cells) used in the memory. The erasing (also known as formatting) process involves putting all memory cells in a state of logical ones.

Thus, with these types of flash EEPROM's, a spare memory equal to the size of the flash EEPROM had to be available in order to erase the EEPROM while retaining the valid data which was contained thereon. For example, if a four megabyte flash memory was used, another four megabytes of memory had to be reserved in order to erase the four megabyte flash EEPROM. This external memory could be a RAM chip, such as a static RAM or DRAM, or could comprise another flash memory array, for example. The valid files are then returned to the flash EEPROM from the external memory after the flash has been formatted. Thus, the space which is taken up by the deleted files is again made available.

U.S. Pat. No. 5,581,723, issued to Hasbun, discloses a process which allows portions of the flash EEPROM to be erased separately from other portions of the flash EEPROM. This patent discloses a method for "clean-up" of the EEPROM so that dirty sectors on it can be released. According to the process, a particular block of the flash memory to be cleaned up is selected. The selection is made based on which block of the flash array is the dirtiest and which block has been through the lowest number of clean up operation. Once the appropriate block to clean up has been chosen, available free sector space on other blocks of the flash memory is located. Once the space to store a valid sector has been located, valid data from the block being cleaned up is moved to the available space. The copying of the valid sectors on the block being cleaned up continues until all of the valid sectors on the block have been moved to the available free space. Then, the block to be cleaned up is erased separately from the other blocks on the array.

U.S. Pat. No. 5,634,050, issued to Krueger, discloses a reclamation routine which reclaims the allocated regions in a block of a flash EEPROM. According to the patent, a block may be reclaimed at several different times, such as when there is insufficient free space to satisfy an allocation request or when the ratio of de-allocated space to block size exceeds a threshold value. The flash EEPROM manager reclaims a block by copying the allocated regions to a spare block, a block that has been erased. The patent also discloses that the flash EEPROM manager could copy the allocated regions to non-flash EEPROM memory, then erase the block. According to the patent, the allocated regions can be copied to be contiguous.

While these patents disclose methods for reclaiming particular portions of a flash EEPROM device when free space is needed, they do not disclose the reclamation and defragmentation of all of the free space on the device. Thus, because all free space on the device is not made contiguous by these methods, a large contiguous file could not be written to the flash memory disclosed in these references, even after the method is performed. Thus, there is a need for a method and apparatus which allows for reclaiming space on a flash memory device on a portion-by-portion basis, and which also allows for all of the invalid space on the entire flash memory array to be reclaimed and defragmented in one continuous operation, so that all possible free space is made contiguous.

Moreover, the references do not disclose reclamation methods which allow both blocked files and contiguous files to be stored on the same flash device and which maintain the structure of the file during the reclamation process. It is desirable to save both contiguous files (a file which has all of its data stored contiguously) and blocked files (a file which has data stored in blocks which can be fragmented across the flash) on the same flash. Then, upon restoration of the space on the flash device, valid contiguous files should be returned to the flash device as contiguous files and blocked files should be returned to the flash as blocked files.

Thus, there is a need for a method and apparatus for restoring and defragmenting an entire flash memory so that all free space is made contiguous, and which can restore valid files in their original format, such that the benefits of both types of file formats (contiguous or blocked) can be retained.

SUMMARY OF THE INVENTION

Accordingly, it is an object of the present invention to provide a method and apparatus for restoring and defragmenting an entire flash memory device on a portion-by-portion basis, without any loss of valid data on the device.

It is another object of the present invention to provide a method and apparatus for reclaiming and defragmenting storage space used by deleted files on a flash memory device which require a minimal amount of free memory for performing the reclamation process.

Yet another object of the present invention is to provide a method and apparatus for reclaiming space on a flash memory device which allows for the entire flash memory device to be defragmented, such that all available space on the device becomes contiguous, thereby providing space for the largest possible file to be written to the device.

Another object of the present invention is to provide a method and apparatus for the reclamation of invalid data on a flash memory which can also restore valid files to the flash memory device in their original format.

Another object of the present invention is to provide a method and apparatus for recovery of storage space on a flash memory which allows contiguous files to maintain their contiguous nature both before and after the restoration process.

Additional objects, advantages and other novel features of the invention will be set forth in part in the description that follows and will become apparent to those skilled in the art upon examination of the following or may be learned with the practice of the invention.

To achieve the forgoing and other objects, and in accordance with one aspect of the present invention, a system for reclaiming memory filled by invalid data on a flash memory device is provided. The system includes a flash memory device which is divided into a plurality of individually erasable memory portions, a designated memory area, and a memory reclamation mechanism. The memory reclamation mechanism is configured to copy all valid data from one of the memory portions of the flash memory to the designated memory area, erase the memory portion that was copied, and to write the valid data from the memory area contiguously to the next available free space on the flash memory device. The memory reclamation mechanism is also configured to repeat the copying, erasing, and writing for each of the plurality of memory portions in a consecutive order. In one embodiment, the reclamation mechanism starts at the first portion on the flash memory and continues without interruption from portion to portion through the last portion. In this embodiment, all valid data becomes contiguous on a first contiguous segment of the flash device and all free space becomes contiguous on a second contiguous segment of the device.

In another aspect of the invention, a method for reclaiming memory filled by invalid data on a flash memory device is provided. The method comprises accessing an individually erasable memory portion of the flash device, and copying valid data from the accessed portion to a designated memory area having a memory capacity at least as large as the accessed portion. The method also comprises erasing the accessed memory portion, and writing the valid data from the designated memory area to the next available free space on the flash device. The writing step is performed such that the valid data is stored contiguously on the next available free space on the flash device. These steps are repeated on each successive individually erasable memory portion of the flash memory device. In one embodiment, a pointer mechanism is updated after the writing step to indicate the location of the next available free space on the flash memory device.

Still other objects of the present invention will become apparent to those skilled in this art from the following description wherein there is shown and described a preferred embodiment of this invention, simply by way of illustration, of a best mode contemplated for carrying out the invention. As will be realized, the invention is capable of other different aspects and embodiments without departing from the scope of the invention. Accordingly, the drawings and descriptions should be regarded as illustrative in nature and not as restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

FIG. 2 is a representation of a portion of a flash memory array before restoration and defragmentation have occurred according to the principles of the present invention;

FIG. 3 is a representation of the portion of flash memory of FIG. 2 after restoration and defragmentation have been applied according to the principles of the present invention;

FIG. 5, including

DETAILED DESCRIPTION OF THE PREFERRED EMBODIMENTS

Figure 1:
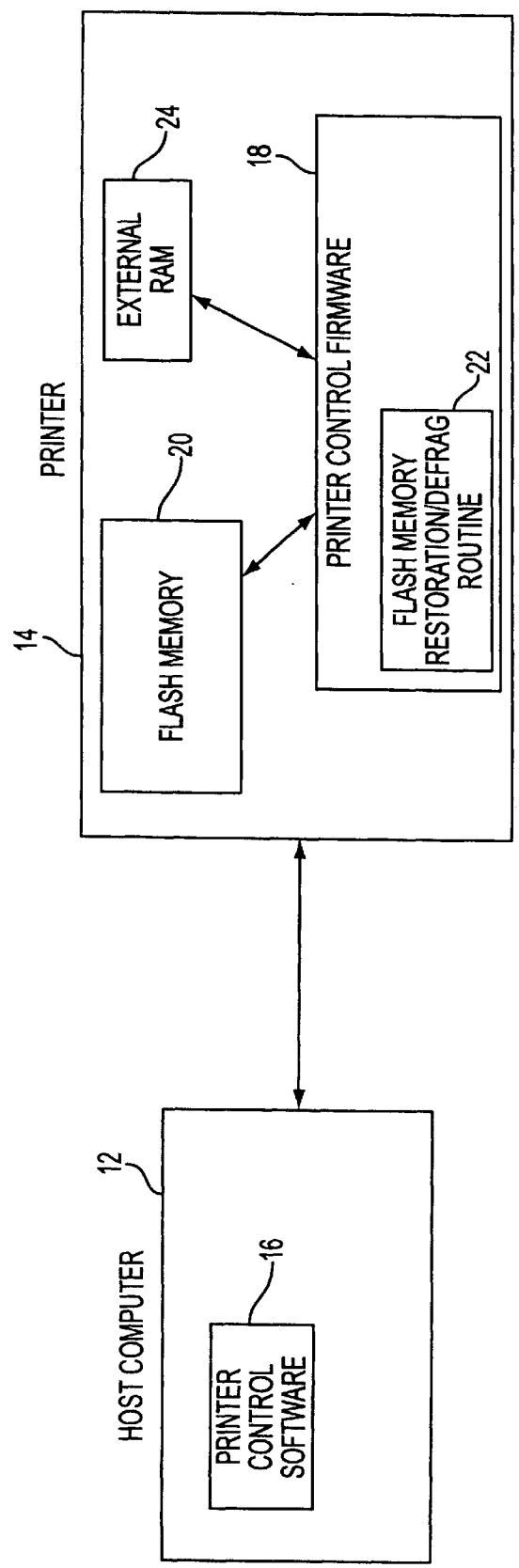
FIG. 1 is a block diagram illustrating an embodiment of the restoration and defragmentation device of the present invention in one possible environment in which it can be used.

Referring now to the drawings in detail, FIG. 1 is a block diagram illustrating one possible environment in which the flash memory restoration and defragmentation routine of the present invention may be utilized. As shown in the figure, a host computer 12 is connected to a printer 14, as is known in the art. The host computer preferably includes RAM memory, ROM memory, a microprocessor, operating software, and other equipment, hardware, firmware, circuitry, or software for use with computers and computing devices. The computer 12 can also include printer control software 16 which allows the user to utilize the host computer for controlling or modifying the operations of the printer 14. Software for obtaining this purpose is described in U.S. Pat. No. 5,720,015, issued to Martin et al., the entire disclosure of which is incorporated herein by reference. This software provides functions such as copy commands, move commands, rename file commands and other printer resource management control functions necessary for optimum printer operation.

The printer 14 includes printer control firmware 18 which is utilized by a printer controller for effecting various printer functions such as maintaining a control panel, interpreting incoming print jobs, and handling commands and data received from the host computer 12. The printer 14 also includes a flash memory 20 which can be used to store data and instructions for printer operations. For example, the flash memory 20 can be used as a non-volatile long-term storage device, and as an alternative to the traditional long-term storage provided by magnetic disk devices. The type of data which might be stored on the flash memory 20 includes various font files which the user may wish to store in the printer 14. Once the user downloads a particular font file to the printer 14 it can be saved in the flash memory 20 and therefore, when the user wishes to use the same font again, the file need not be downloaded from the printer 12, thereby providing a more efficient print operation. Printer control macros can also be stored in the flash memory 20. Such macros can be used, for example, to generate headers on the top of a page on a word processor program. Downloading and saving font and macro data to a flash memory of a printer is described in detail in U.S. Pat. No. 5,239,621, the entire disclosure of which is incorporated herein by reference.

As discussed above, because of the nature of flash memory devices, when the font files or macro files or other data which is saved in the flash memory 20 is changed, the original file is marked "invalid" (i.e., "deleted") by changing a bit in the file header, as discussed in more detail below. The data for the file remains on the flash memory, however.

If the file is a "blocked" file, it may be appended to by simply writing the additional blocks for the file to the next available blocks in free space of the flash memory 20. Thus, the data for a blocked filed can be fragmented in several different non-contiguous data blocks throughout the flash memory. In addition, the header block for the blocked file can be separate from the data blocks. However, a "contiguous" file cannot be appended to in this manner. The data for a contiguous file must be saved contiguously so that the file can be executed directly out of the flash memory. Thus, to change or modify a contiguous file, the file header of the old version must be marked as invalid and an entirely new file created in free space in the flash memory 20.

At some point, it may be necessary to restore the memory utilized by deleted files on the flash memory 20, so that other files can be written to the device. For example, if the user attempts to write a file to the flash memory 20 and there is not enough room on the memory 20 to write the file due to its length, the printer control firmware 18 can indicate to the user through the computer 12 that the file cannot be written and that the flash memory 20 should be restored and defragmented. Alternatively, an "out of flash memory" message may appear on the display panel for the printer. In addition, rather than waiting until the user attempts to write a file which is too large, the printer control firmware 18 can monitor the amount of memory on the flash memory 20 and indicate that the flash memory 20 should be restored when a predetermined ratio of available space to total space is reached. Other memory monitoring routines could be utilized as well.

Also, as another alternative, the user could decide to restore and defragment the flash memory 20 on his or her own initiative, and without prompting from the printer 14 or computer 12. In this embodiment, once the user sends the appropriate command to start the routine, the amount of "wasted" space taken up by inactive files is calculated by adding the amount of available "free space" and the amount of space taken up by "active" files (i.e., valid or undeleted files) and subtracting this number from the total capacity of the flash memory device 20. If the amount of "wasted" space is less than a predetermined amount, the user can be informed that restoration and defragmentation is not necessary.

If invoked, the flash memory restoration/defragmentation routine 22 reclaims space taken up by invalid files in the flash memory 20 and defragments the entire flash memory so that all valid files are in a contiguous relationship and all free space on the flash memory is also in a contiguous relationship as described in further detail below. This not only reclaims the space taken by the invalid files but also places all of the free space on the flash memory 20 in a contiguous relationship, thereby providing space for the largest possible contiguous file to be placed on the flash memory. In addition, the routine 22 allows both contiguous and "blocked" files, which may be stored on the flash memory 20, to be returned to the flash memory while maintaining their respective contiguous or blocked nature.

Furthermore, the flash memory restoration/defragmentation routine 22 is performed to the entire flash memory 20 but on a sector-by-sector basis. Thus, rather than having to designate a free memory array equal to the size of the flash memory 20 to perform the routine 22, the designated memory need only be equal in size to the size of the sector divisions on the flash memory 20. The routine 22, in addition to addressing the flash memory on a sector-by-sector basis can also transfer data on a block-by-block basis. In a preferred embodiment, a sector on the flash device is 256 kilobytes in size and each sector is divided into blocks which are 256 bytes in size. Thus, the free space which is designated for use during the routine need not be contiguous because data can be moved on the smaller block-by-block basis.

In the embodiment shown in FIG. 1, an external RAM memory 24 is used to perform the routine 22. The free memory on the RAM 24 need only be as great as the size of the sector divisions on the flash memory 20, and this free memory, as noted, need not be contiguous. This memory 24 could comprise other memory devices and could also comprise a designated free memory portion on the flash memory 20 itself.

A portion of the flash memory 20 is schematically illustrated in FIG. 2. As shown in the figure, the memory is divided into a plurality of sectors 30, 32, 34, and 36, and each of the sectors is divided into a plurality of blocks 40, 42, 44, 46, 48, 50, 52, and 54. Preferably, the sectors are 256 kilobytes of memory and each block is 256 bytes of memory. However, it is contemplated that alternatively sized memory divisions can be utilized without departing from the scope of the present invention.

It is preferred that a sector is addressed on a "logical" or "virtual" basis, rather than a "physical" basis. In this way, a number of "physical" sectors from a number of flash memory chips can be combined into one "logical" sector address. For example, if each chip has 8 bit capacity, combining 4 flash memory chips into 1 "logical" sector results in each data location of a logical sector being 32 bits wide.

As shown in FIG. 2, the files which are saved in the flash memory device 20 are saved both in "blocked" file format, such as file 1 which spans blocks 44–48 of sector 30, and in "contiguous file format", such as file 2 which spans blocks 50–54 of sector 30 and blocks 40–44 of sector 32. The ability to save files in the desired format in the same flash memory array, provides the flash memory with the advantages of both types of files. For example, a file that would be typically appended frequently should be saved in the blocked file format, such that appending the file can be achieved while using the minimum amount of memory space. On the other hand, a file which will be executed from memory should be saved in a contiguous file format, such that the file can be executed directly out of the flash memory 20. Executable files which are saved in a blocked format must be first arranged contiguously in another memory device, such as RAM memory, in order to be executed. This additional step of having to rearrange the file reduces efficiency.

The flash memory 20 of FIG. 2 also contains some files which have been "deleted" by being marked invalid. These files include the blocked file 3, which spans blocks 46–52 of sector 32, and the contiguous file 5, which spans box 48–54 of sector 34. These deleted files take up space in the flash memory 20 and therefore waste a portion of the available memory.

The flash memory 20 of FIG. 2 also includes a file system header 60, at block 40 of sector 30, and a block allocation bit map 62, at block 42 of sector 30. The file system header 60 is a file which includes a number which indicates that the flash memory 20 is valid, a pointer to the first file in the flash memory 20, a flag which indicates whether the memory 20 can be written to, a number indicating the size of the flash memory, and a number indicating the version of the file system header (the file system header can be modified and updated over time).

The block allocation bit map 62 is a bit map which indicates whether each block on the flash memory 20 has been written to or, alternatively, has not been written to and therefore constitutes free space. Thus, whenever data is written to a block of the flash memory 20, the bit map is updated to show that the newly written blocks have been filled. Similarly, whenever one or more portions for the entire flash memory device 20 is erased (or "formatted") the block allocation bit map indicates that the flash memory has free space at those locations. Thus, the blocks in which any file is stored, whether the file has been marked deleted or is still active or valid, are indicated in the block allocation bit map as being allocated (or "used"), and the remaining blocks to which data has not been written are indicated as being deallocated (or "free"). Although shown as taking tip only 1 block in FIG. 2, the block allocation bitmap will actually take up 9 blocks on a 4 megabyte flash memory device.

Each file shown in FIG. 2 also has a file header at the first block used up by the file. Preferably, this file header includes a number indicating that the memory is valid, the name of the file, a pointer to the first block of data in the file, a pointer to the next file, and a number indicating the size of the file. Other data can be included in this file header such as a description of the file, a pass word, and an indicator whether the file is hidden. If the file is a blocked file (i.e., is stored in a series of linked blocks rather than contiguously), the "size" field of the file header can be filled with all logical 1's. If, on the other hand, the file is a contiguous file, the field for the size of the file is filled with a number indicating how many bytes are taken up by the data of the file.

Blocks 48–54 of sector 36 in FIG. 2 represent the free space available on the flash memory 20. It is in this free space that additional files, such as modified contiguous files, or additional blocks, such as blocks to be appended to a blocked file, are written. The device using the flash memory 20 knows where to put this new data by looking at the block allocation bit map or by utilizing some other pointer mechanism.

As shown in FIG. 2, the data for a blocked file is saved in various blocks across the flash memory. These data blocks need not be contiguous because the file is a blocked file, meaning that all of the data blocks are linked. Each data block has a header at its beginning which contains a pointer which points to the next block in the data file. The data block header also has a number indicating how much of the data block is used. In this manner the data for a blocked file can be reconstructed because of the pointer in the block headers. Therefore, data for a blocked file can be fragmented across the flash memory 20. As shown in FIG. 2, the data for file 1 spans blocks 46 to 48 of sector 30, block 54 of sector 34, and blocks 40–42 of sector 36.

FIG. 3 illustrates the flash memory 20 after the restoration and defragmentation routine according to one embodiment of the present invention has been applied. As shown in FIG. 3, the deleted files, (files 3 and 5) have been removed from the flash memory device 20, thereby reclaiming additional free space on the device for saving additional and larger files. As also shown in FIG. 3, all of the valid data is contiguous starting from the first block of sector 30 to block 46 of sector 34. (Because data is read, written, and moved in blocks, there may be some nominal amount of free space between blocks, such as between files. However, this free space will be relatively small. Thus, the term "contiguous" as used herein should not be limited to "absolutely" or "completely" contiguous, but, rather, refers to "substantially" contiguous.) Thus, instead of simply freeing up the blocks taken up by files 3 and 5, the routine defragments the entire flash memory 20 such that all of the free space is contiguous, thereby moving the valid data blocks toward the beginning of the flash. Both contiguous and blocked file blocks can be moved as necessary to make the valid date contiguous. This allows the largest possible contiguous file to be written to the flash memory.

Figure 4A:
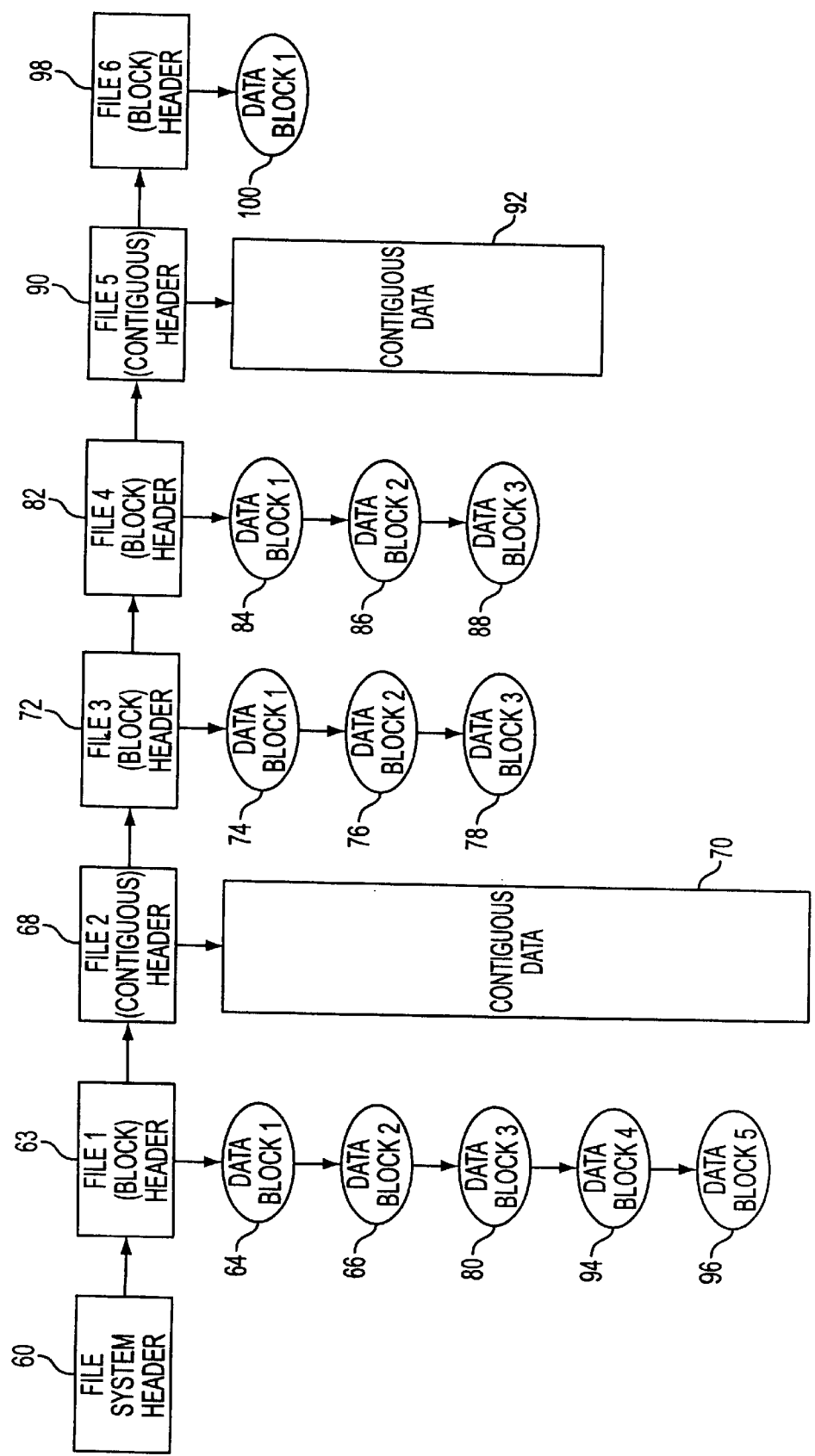
FIG. 4a is a representation of a linked file header management system corresponding with the files shown in the flash memory of FIG. 2.

FIG. 4a illustrates the linked file and linked block structure described above with respect to FIG. 2, and corresponds with the data shown in the flash memory of FIG. 2. As noted above, the file system header has a pointer which points to the address of the file header 63 for the first file in the flash memory. This file header 63 then points to the header 68 of the next file in the flash memory, which in turn points to the header of the third file header 72 in the flash memory, and so on. Thus, all of the file headers are linked sequentially from the first file written to the flash to the last file which was written. Thus, if the printer wishes to obtain and utilize file 4, it will look in the file system header 60 which will point it to the file header 63, which in turn will point it to the file header 68, which will point to the file header 72, which finally points to the desired file header 82. The printer knows when it has reached the correct file because the desired file name will match the file name in the file header 82. Whenever the file name does not match, the printer accesses the pointer to the next file header, and goes to that file to search for the file name. The searching of the file headers continues until a match is found on a valid file, or the end of the list is reached Likewise, the data block headers for blocked files are linked. Thus, for blocked file 1, the file header 63 points to the first data block 64. The header of the first data block 64 then points to the second data block 66, and the header for data block 66 points to the next data block, data block 80. This continues through all of the data blocks of the file. A data block of a blocked file is marked as being the last block in the file by placing a code in the pointer of its header, such as, for example, a series of logical 1's. Thus, if the printer wishes to pull together the data for file 1 shown in FIG. 4a, it locates the file system header 60 which points to the header 63 of file 1. The header 63 points to the first data block 64 of the file which points to the next block, and so on, as noted above. The data can then be pulled from these blocks into contiguous space in a memory, if desired, so that the data can be executed by the controller.

In contrast, for a contiguous file, such as file 2, the file header 68 points to the address of the first block of data for the file, but the blocks of data for the file are not linked by headers, as shown in FIG. 4*a*. Rather, the file header 68 has a field which indicates the size of the contiguous file. By knowing the address of the start of the data and the size of the file, both of which are stored in the file header, the controller can determine where to start reading the data and when to stop reading the data. Thus, the file can be executed directly out of the flash memory.

Figure 4B:
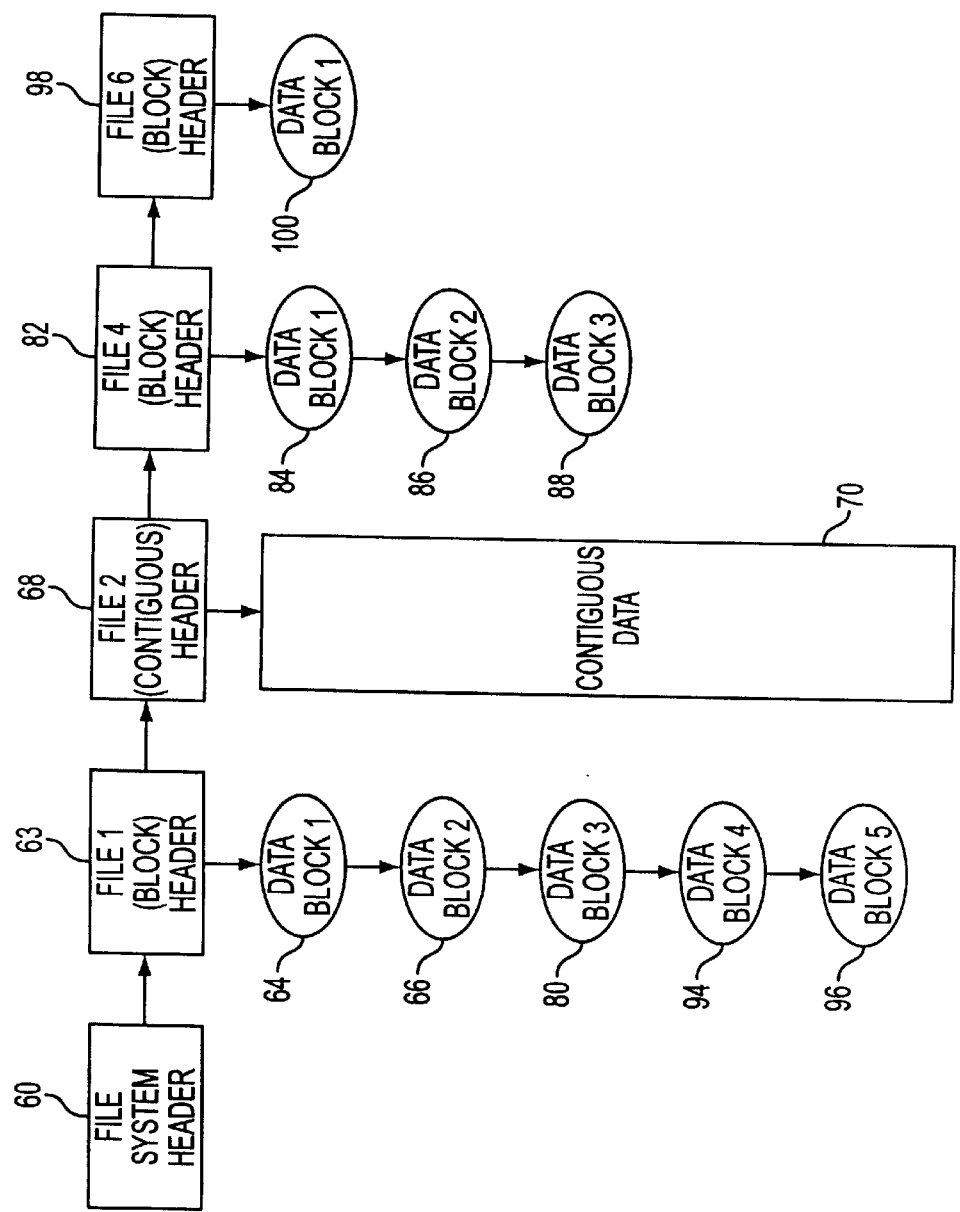
FIG. 4b is a representation of a linked file header management system corresponding with the files shown in the flash memory of FIG. 3.

FIG. 4*b* shows the linked headers after restoration and defragmentation has been performed on the flash memory. This linked header configuration corresponds with the flash memory configuration shown in FIG. 3. File 3 and file 5 were removed during the restoration process because they were marked as invalid, and the flash memory was defragmented, thereby changing the locations of the blocks of data in the flash. Accordingly, the file headers must be updated to point to the correct file locations. For the configuration of FIG. 4*b*, file header 68 for file 2 now points to the address for header 82 of file 4. Likewise, file header 82 of file 4 has been updated to point to the address for header 98 for file 6.

The data block locations for file 4 and file 6 will have changed as well. Thus, the file header 82 has been updated to point to the new location of the data block 84. The headers for the data blocks 84, 86, and 88 have been updated as well. Similarly, the file header 98 for file 6 is updated by the routine to point to the new location of data block 100. It is contemplated that other means of file management could be used, other than linked header system shown in FIG. 4, without departing from the scope of the invention.

Figure 5A:
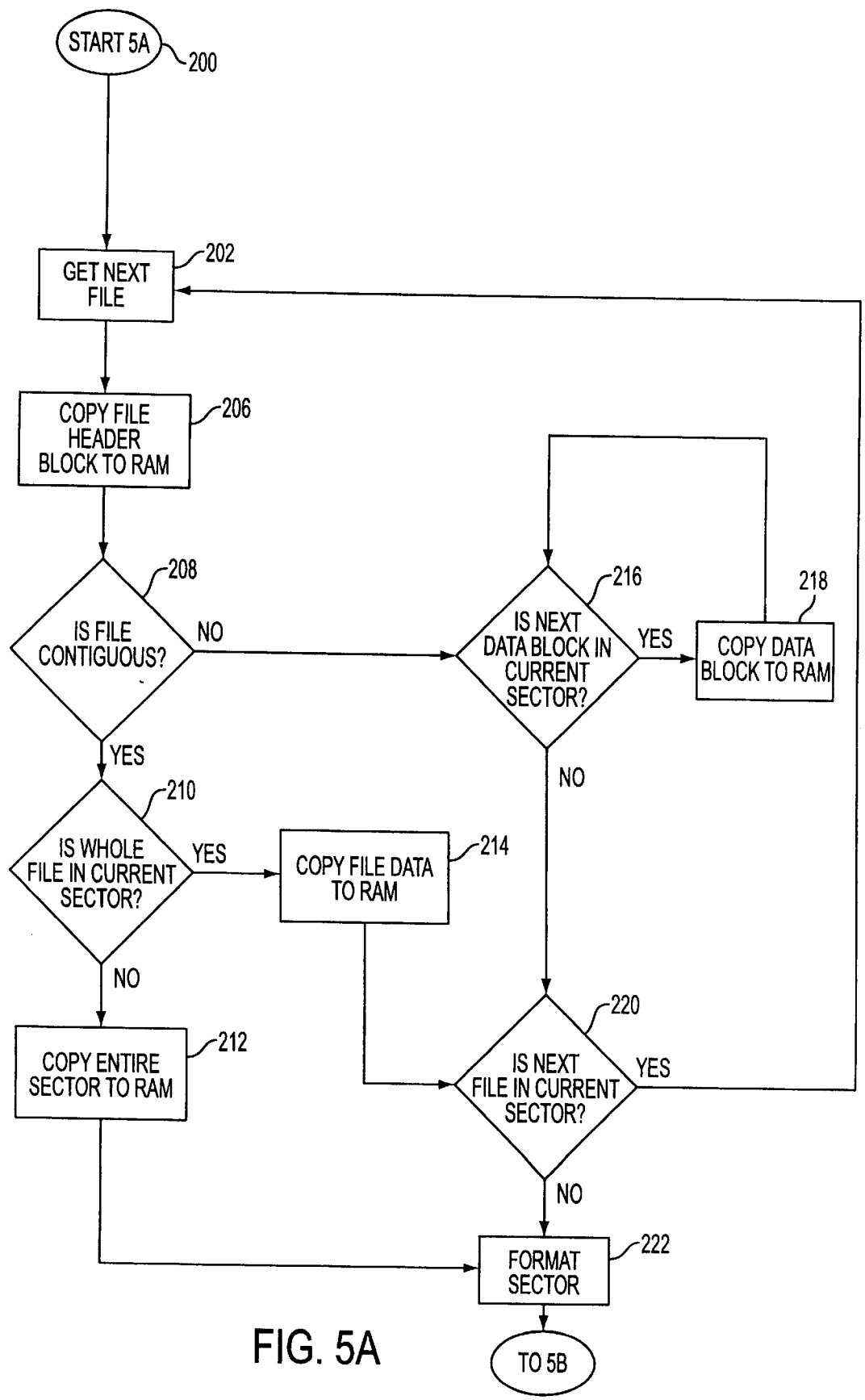
FIG. 5a, FIG. 5b, FIG. 5c, and FIG. 5d, is a flow diagram illustrating a method of flash memory restoration and defragmentation, according to one embodiment of the present invention.
Figure 5B:
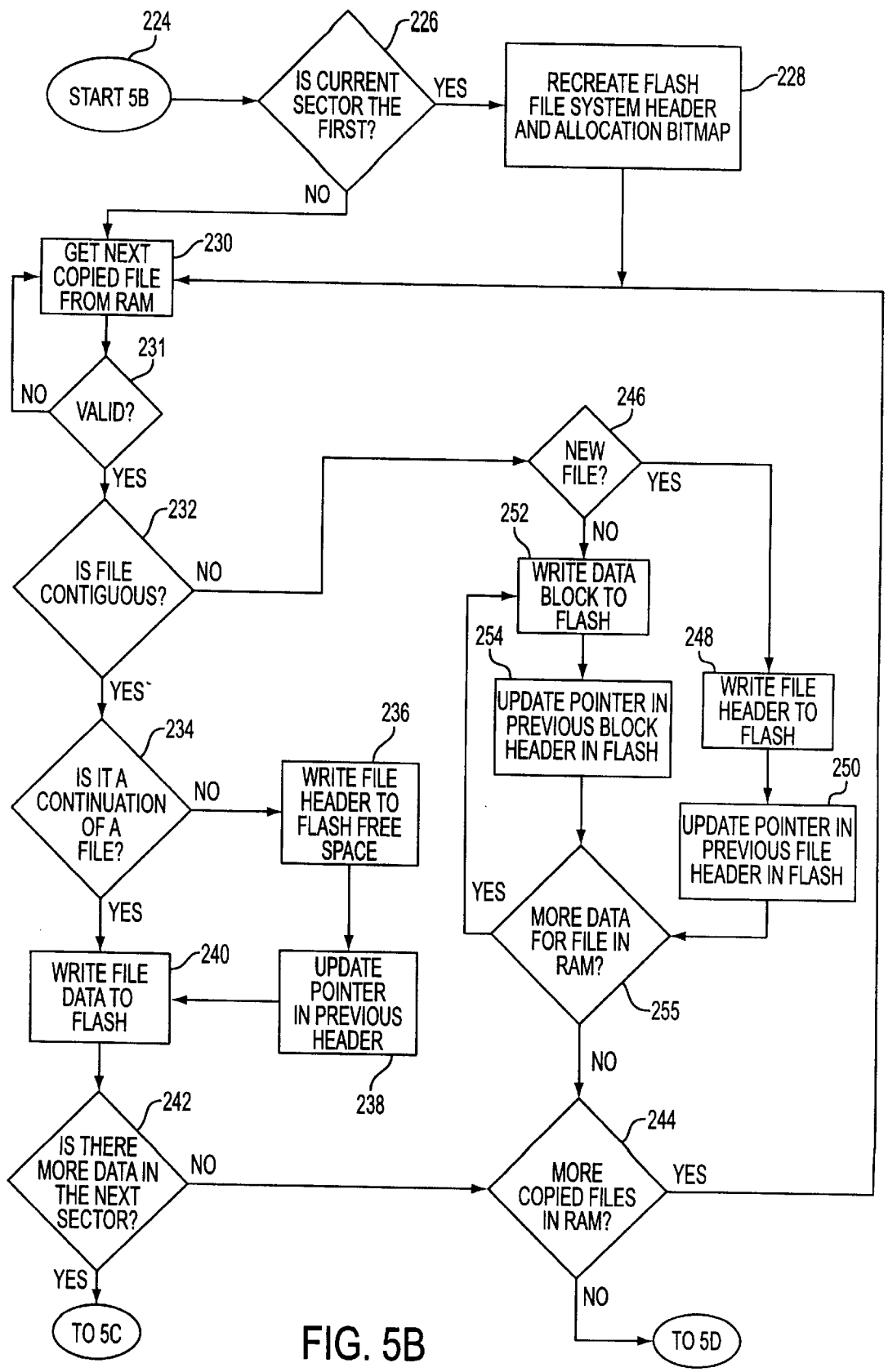
Figure 5C:
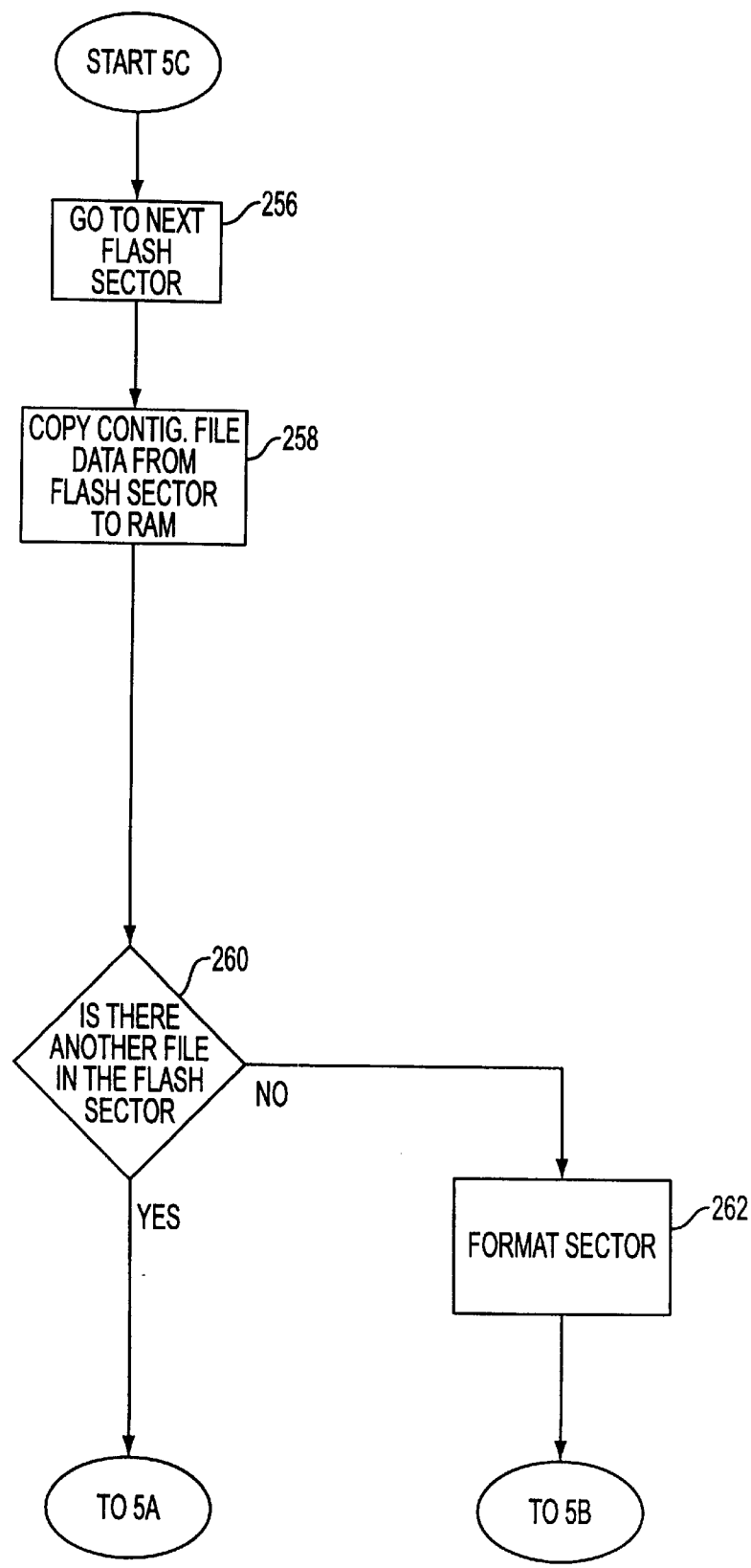
Figure 5D:
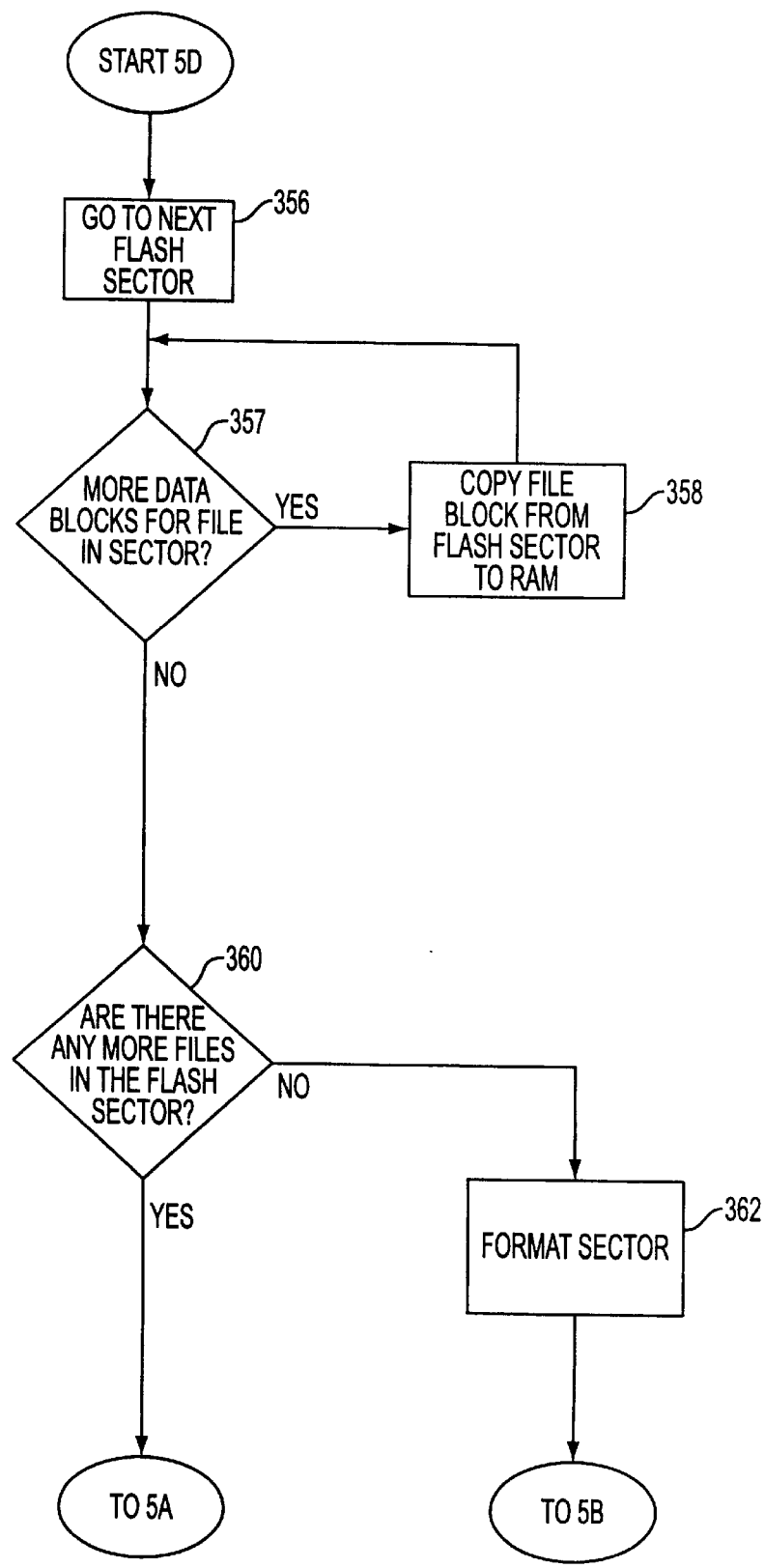

FIG. 5 is a flow diagram starting at FIG. 5A, and continuing to FIG. 5B, 5C, and 5D, illustrating a preferred embodiment of the operation of the restoration and defragmentation routine 22 of FIG. 1. The routine can operate on the flash memory 20 on a sector-by-sector basis and continue sequentially from sector to sector until each sector has been subject to the routine. In this embodiment, no other data is written to the flash memory by the printer until the restoration/defragmentation routine has been completed on all sectors in the flash memory.

FIG. 5A illustrates the process of copying files from a sector of the flash memory to the designated free space in the external RAM (or other designated memory device), and then formatting the flash memory sector copied. The operation is started at block 200. Then, at block 202, the routine accesses the current sector of the flash memory 20 and addresses the first file on this sector using the linked file header system, such as that of FIG. 3 for example, which is initially copied to a list. According to this step, the first address on the list that is within the boundaries is accessed. (The current sector is initially defined to be the first sector on the flash memory. The method will then proceed sequentially through the remaining sectors of the flash array, as discussed in more detail below.)

At block 206, the file header for the file is copied to the designated free space. As shown in FIG. 1, this free space can comprise space on a RAM memory device external to the flash memory device. Alternatively, the free space can be located on the flash device. As noted above, the free space need only be as large as the size of a sector on the flash (e.g., 256 kilobytes).

Once the file header is copied, it is determined, at block 208 whether the file is contiguous. This can be achieved, as noted above, by determining whether the size field in the file header is equal to a certain predetermined code, such as a plurality of logical 1's. It is contemplated that other means for determining whether the file is contiguous could be utilized, such as by setting a bit in the header to a 1 or a 0 depending on the type of file.

If the file is contiguous, decision block 210 is executed and it is determined whether the entire file is located in the particular sector at issue (i.e., the "current sector). This can be achieved by adding the file size, stored in the file header, to the location of the first block of data for the file, also stored in the file header. If this sum is greater than the address of the next sector, then the file is not contained entirely in the current sector, and, instead, runs over into the subsequent sector or sectors. The addresses for the various sectors can be stored or calculated in a number of manners. For example, a list of the offset locations for the flash sectors can be stored. When necessary, this number can be added to an offset for the flash memory itself to get the address for the particular sector. Alternatively, a table of the start and stop boundaries for each sector can be kept. As another alternative, because the size of each sector is known ahead of time, a calculation can be made to determine the address of the start of each sector.

If the contiguous file does run over to the next sector or sectors, then block 212 is executed and the rest of the data in the current sector is copied to the designated free space. Then, the process proceeds to block 222 and the current flash sector just copied is formatted. Formatting (or erasing) of the sector is typically performed by applying a voltage to a location on the sector which applies the voltage to all of the cells on the sector, thereby resetting them to the logical 1 state. After formatting, the routine continues to block 224 of FIG. 5*b*.

If, however, it is determined at block 210 that the entire file is located in the current sector, then block 214 is executed and the amount of data for the file, indicated by the file size field of the file header, is copied from the flash memory to the free space.

After block 214, block 220 is executed and it is determined whether the next file is in the current sector. This can be achieved in the embodiment described above by checking the file header of the current file for the pointer pointing to the next file. If this pointer shows an address inside of the current sector boundaries, which are known, then the routine loops back to step 202 and the next file in the sector is addressed. If, however, it is determined that the next file is not within the current sector, then the entire current sector is formatted at step 222, and the process continues to block 224 of FIG. 5*b*.

On the other hand, if it is determined at step 208 that the file is not contiguous, such as according to the methods described above, then the file is known to be a "blocked" file. If this is the case, the routine continues to block 216 where it is determined if the next data block for the file is in the current sector. During the first iteration involving a blocked file, this is determined by examining the pointer in the file header which points to the address of the first data block for the file. If this address is within the sector boundaries (which are known ahead of time or calculated, as discussed above), then that data block is copied to the free space at block 218. The routine then returns to block 216 and, during subsequent iterations, the pointer in the block headers for the file are examined to determine if they are on the current sector. If this is answered in the affirmative, the loop from block 218 and back to block 216 is continued, and additional blocks for the blocked file are copied to the free space.

Once it is determined, at step 216 that the next data block is not in the current sector or that the last data block for the blocked file has been reached, (as indicated on the block header for the last data block for the file in the sector), then the routine continues to step 220.

As noted above, at step 220, it is determined if the next file is in the current sector by examining the pointer to the next file on the current file header (which has already been copied to the free space at step 206). If the next file is in the current sector, the operation returns to step 202 and the next file is obtained. If the next file is outside of the current sector boundaries, however, the sector is formatted, at step 222 and the method continues to block 224 of FIG. 5b.

FIG. 5b illustrates the operation of the routine as it examines the data in the external RAM which has been copied from the flash memory. At block 226, it is determined whether the sector which has just been copied and formatted, through the steps of FIG. 5A, is the first sector on the flash memory. This can be decided, for example, by comparing the "current sector" address to the address of the first sector, or by comparing the "current sector" number to the number of the first sector. If the current sector is the first sector on the flash, then the flash file system header and the block allocation bitmap (see numerals 60 and 62 of FIG. 2), must be recreated on the first blocks of the flash memory. For the file system header 60, the version field should be incremented to indicate that a new version of the header is being written. Also, the pointer which points to the first file on the flash memory should be changed once the first file is returned to the flash, as described in further detail below. Initially, when the flash system header is first re-written to the flash, this pointer can be set to a default to indicate that it is the first and last file in the flash memory.

The bitmap 62 should be re-created to indicate that only the blocks for the file system header 60 and the bitmap itself are currently allocated. The bitmap is then continually updated as new data is written back to the flash memory during the restoration/defragmentation process and thereafter, and thereby acts as pointer to the next available free space.

If the current sector is not the first sector, or, alternatively, after the recreation block 228, the first file in the external RAM memory is obtained, at block 230. This can be achieved by first copying all of the linked headers to a list at the start of the routine (as noted above). Then, the list is consulted and the first data block that is in the RAM that corresponds with an address on the list is obtained. The header for this data block is read from the list and the field indicating whether the file is valid or active is accessed. It is then determined at step 231 whether the file is valid based upon this field. If the field indicates that the file is not valid, then the routine loops back to block 230 and gets the next block from the RAM that corresponds with an address on the list. (It is also contemplated that data can be checked for validity before it is copied to the RAM so that only valid data is copied to the RAM.)

However, if the file is valid, it is determined (at step 232) whether the block corresponds with a contiguous file. The file size field will indicate if the block corresponds with a contiguous or a blocked file.

If the file is contiguous, then it is determined, at step 234, whether the file began during this sector or is a continuation of a file from an earlier sector. If the contiguous file has a file header block with an address in the current sector boundaries, then it is known that the file is not a continuation and the file header must be copied to the flash memory first at the next available formatted free space on the flash memory as indicated by the bitmap 62. By writing to the next available free space rather than to the same sector from which the data came, the valid data on the flash memory is defragmented. This occurs at step 236.

After this step, step 238 is executed and the pointer in the header for the file previously copied back to the flash memory must be updated to point to the new location of the file header just copied back. The previous file copied can be reached by going to the recreated file system header in the flash and running through the file headers until the last file is reached (as can be indicated by a default). Alternatively, a second list can be kept in memory of the file header locations which have been written back and the last file location can be chosen. The pointer field in this previously copied file header is updated to point to the location of the latest file header copied (the header copied at step 236).

Then, once the file header has been copied, step 240 is executed and the file data associated with the contiguous file is copied back to the flash memory at the next available free space (As noted above, the location of the next available free space can be determined by the bitmap 62, which is continually updated as data is written, or by keeping a pointer.) This can be achieved by determining the file size in the file header and copying the amount of data shown by the file size field from the RAM to the flash memory. This step is also executed if the file is a continuation of a file, as determined at step 234. The only difference is that, if the file is a continuation, then the file header should not be copied back to the flash. Only the data for the file is copied back to the flash and not the header, in this scenario.

The amount of data to be copied is indicated by the file size field of the contiguous file header, as noted above, and this file size field can be saved in a variable in the program. A running tally of the amount of data which has been copied for the contiguous file can also be kept and compared to this file size variable to ensure that all data for the file is copied contiguously.

Then, the routine proceeds to step 242 where it is determined whether there is additional data for the contiguous file located in the next sector of the flash memory. This can be determined by examining the file size variable and the running tally of data copied from the RAM. If the tally is less than the file size variable, then additional data needs to be obtained from the next sector, copied to the RAM, and returned to the flash memory at the next available free space.

If there is more data to be copied from the next sector for the contiguous file, then the routine proceeds to FIG. 5C. If there is no more data for the contiguous file in the next sector, then the routine proceeds to step 244 where it is determined if there is more data in the RAM which has not been returned to the flash. This step can be achieved by keeping a running pointer in the RAM memory of the copied data which has been processed out of the RAM. If there is more data in the RAM to be processed, then the routine returns to step 230 and the next block of data in the RAM is obtained. If there are no more data blocks to be processed in the RAM (e.g., the pointer is at the end of the designated memory), then the procedure proceeds to block 245 and the next sector on the flash array is addressed (i.e., the sector immediately following the "current" sector). This "next sector" becomes the "current sector" and the process proceeds to block 200 of FIG. 5a so that the restoration process can be carried out on this next sector.

If it is determined at step 232, on the other hand, that the block corresponds with a "blocked" file, then the routine proceeds to step 246 where it is determined if the block is the start of a new blocked file or a continuation of a block file. This determination can be made by determining the location of the file header for this block and determining whether that header is in the boundaries for the current sector. Alternatively, it can be determined if the data for the file retrieved starts with a file header. If the file is a new file, then the routine proceeds to step 248 and the file header block is copied to the flash at the next available flash free space. Step 250 is then executed and the previous file header copied to the flash is updated such that its pointer points to the address of the latest file header to be copied (the file header copied at step 248). Step 250 is similar to step 238 described above.

If the block of data is issue does not correspond with a new file (it corresponds with a previously restored file header), then it is a data block and it also needs to be copied to the flash memory, at step 252. However, instead of updating the file header of the previous file copied, the pointer in the block header for the previous block copied to the flash for the file needs to be updated, and this is shown at step 254. The routine can recognize, through the copied file link list, stored in memory, with which file that the block is associated. Then, the flash memory is accessed, that file is located through the file headers, and the last block of the data blocks is located through the linked data block headers, as described above. The header for this last data block is then updated to point to the address of the block just copied at step 252. This pointer updating step is shown at step 254.

After step 250 and step 254, the process continues to step 255 where it is determined whether additional data for the file is located in the "current sector" boundaries. To do this, the linked list is consulted to determine the address of the next data block for the blocked file and, if this address is within the boundaries, then the routine returns to step 252, and the block is written to the next available flash free space. Step 254 is then executed and the previous block written back to the flash for the file is updated. This loop continues until all the data in the RAM for the file has been copied back to the free space on the flash. In this manner, fragmented data blocks for a sector of a blocked file in RAM become defragmented in the flash free space.

Then, the routine proceeds to step 244 where it is determined if there are more file data blocks in the RAM memory to be copied to the flash for the current sector. If there are, then the routine loops back to step 230 to get the file block from RAM. If there are no more files, then the routine continues to FIG. 5d and the process is repeated on the next sector to be restored on the flash memory.

FIG. 5C shows the operation of the routine after it has been determined, at step 242 of FIG. 5b, that a contiguous file from the sector being currently restored carries over into the next sector to be restored on the flash memory. In this case, step 256 is executed and the next sector on the flash array (i.e., the next consecutive sector on the array to which the restoration procedure has not yet been applied) is addressed. Then, at step 258, the contiguous file data on this sector is copied to the RAM memory. As noted above, the system keeps track of how much additional data for the contiguous file needs to be copied from the flash array to the RAM. Once this data is copied, it is determined at step 260 whether there are any additional files on this sector of the flash memory.

If there are additional file data blocks on the sector as determined by the list, then the routine returns to FIG. 5A to examine and copy these files. If there are no more such blocks, step 262 is executed and the sector is formatted. Once formatted, the routine returns to the steps of FIG. 5b to copy the valid data from the RAM back to the flash memory. Thus, the method of FIG. 5c is executed whenever a contiguous file "runs over" into another sector. Rather then returning to FIG. 5A, and going to the next file on the next sector, the routine copies the remaining data for the contiguous file from the next sector, thereby keeping the data contiguous and maintaining the file format. A list or pointer can be kept to ensure that the rest of this contiguous data is copied and that the program does not erroneously skip to the next file.

Turning now to FIG. 5D, which continues from block 244 of FIG. 5b, the next sector in the flash memory is addressed at block 356. Then it is determined, at block 357 whether there is more data for the blocked file at issue (from FIG. 5B) in the next flash sector. If there is more data, block 358 is executed and the blocks are continually copied to the RAM from the sector. This loop from block 357 to block 358 continues until there are no more data blocks for the file in the sector.

Then, it is determined, at block 360, if there are any more files in the sector. If this is answered in the affirmative, then the program continues to FIG. 5a so that these files can be copied to RAM. If there are not any more files, then the sector is ready to be formatted and this occurs at step 362. The process then continues to FIG. 5B so the valid flash files in RAM can be restored contiguously.

When data is copied from the RAM memory back to the flash memory, as discussed above in relation to FIG. 5b, the data is copied back to the flash in consecutive order starting from the block following the block allocation bitmap 62. A pointer is kept to keep track of where the next data should be written on the flash memory—i.e., where the next free space begins. Also, the bitmap 62 in the flash memory is continually updated to show where data has been written to the flash. The bitmap will fill consecutively from the start through the end. Accordingly, data is written from the current sector of the flash memory to the RAM, the flash memory is formatted, and then the valid data is written back to the flash memory to wherever the next free space begins, rather than to the current sector (although the next available free space may be the current sector). This keeps all valid data contiguous at the front of the flash memory and all free space contiguous to the end of the flash memory.

Figure 6:
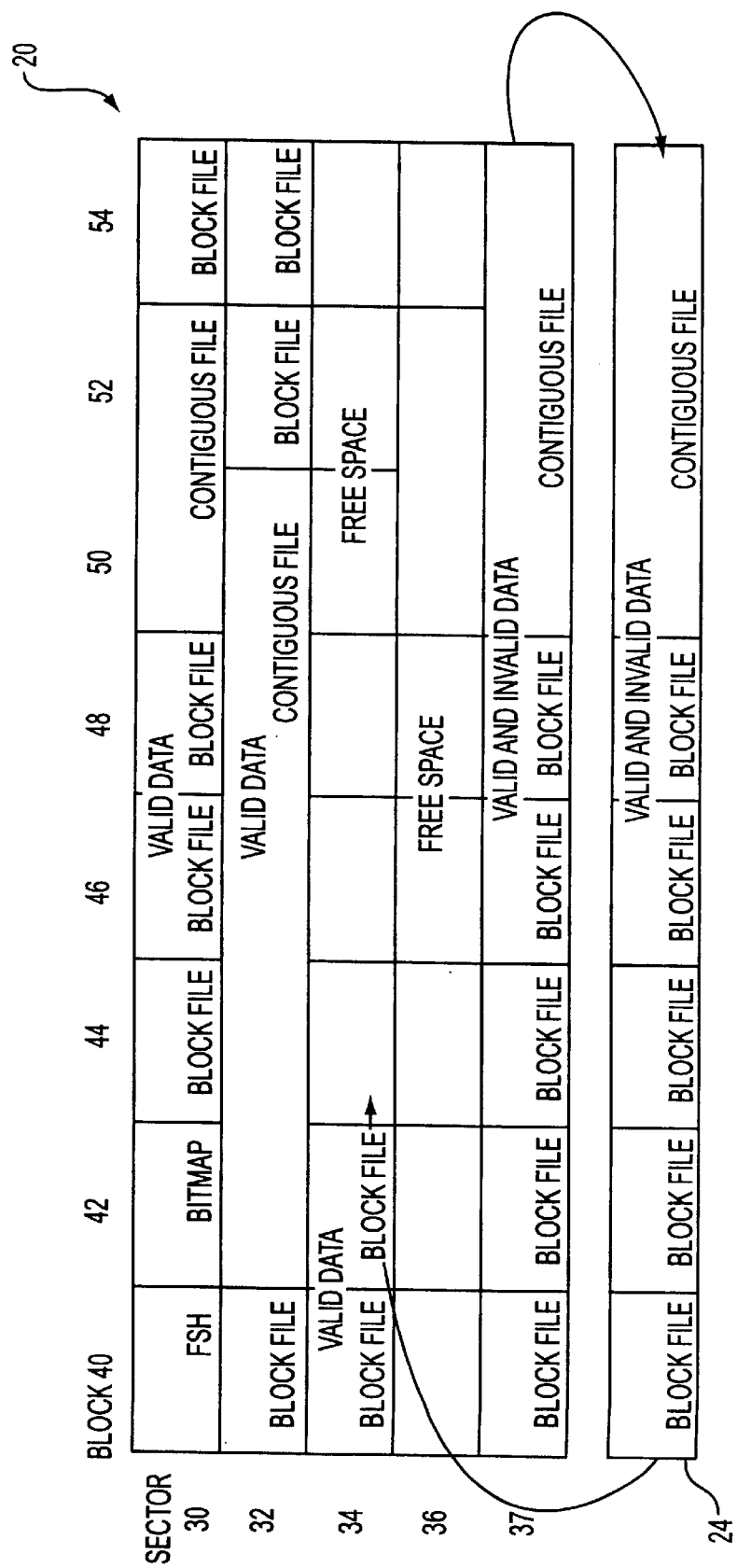
FIG. 6 represents the physical movement of data according to one embodiment of the flash memory restoration method of the present invention.

The process of FIG. 5 is depicted schematically in FIG. 6. The current sector is sector 37. The data on this sector is transferred to the external RAM 24. Sector 37 is then formatted to free up additional free space. Valid data in the RAM 24 is then copied back to the flash device 20 at the next available free space. The next available free space on the flash device shown in FIG. 6 is sector 34, block 44. A pointer is maintained to keep track of the next available free space, as is the bitmap 63.

It should be understood that the process depicted in FIG. 5 is one preferred embodiment of the present invention and that numerous other embodiments could be derived without departing from the scope of the invention. For example, it is contemplated that a second flash memory array could be utilized for the designated free space. This second array could be equal in size to the first flash memory and have address configurations which correspond to that of the flash memory. Then, the entire first flash memory could be copied to the second flash memory and reformatted. The defragmentation procedure would then consist of utilizing the linked headers, now located in the second flash memory, to locate valid files and return them in to the first flash memory in consecutive order, such that defragmentation occurs. Because the headers would still be linked in the second flash memory, valid blocked files which are fragmented across the second flash, could be returned to the first flash in a defragmented format. For example, if a blocked file is reached in the second flash through the linked headers, and the header indicates that it is valid, it can be copied back to the first flash in the same order indicated by its block header pointers. Thus, in the example of FIG. 2 and FIG. 4a, file 1 would be copied back to the next available free space on the first flash memory in the following order: block 64 then block 66 then block 80 then block 94 then block 96. This would make all blocks for the blocked file 1 contiguous in the first flash memory. As another alternative, valid files can be restored to the flash in their original order but with the deleted portions removed and the valid files joined, such that all valid data is contiguous.

The methods depicted above are preferably embodied in computer programs that utilize input statements, output statements, decision statements, assignment statements, loops, variables, arrays, and/or other statements and techniques. For example, the "C" programming language could be utilized. As can be understood, such programs may take on a number of forms and arrangements, utilize a variety of variable names and commands, and be implemented in any of a number of programming languages without departing from the scope of the invention.

The foregoing description of the preferred embodiment of the invention has been presented for purposes of illustration and description. It is not intended to be exhaustive or to limit the invention to the precise form disclosed, and modifications and variations are possible in light of the above teachings. The embodiment was chosen and described in order to best illustrate the principles of the invention and its practical application to thereby enable one of ordinary skill in the art to best utilize the invention in various embodiments and with various modifications as are suited for the particular use contemplated. It is intended that the scope of the invention be defined by the claims appended hereto.

What is claimed is:

1. A system for reclaiming memory filled by invalid data on a flash memory device, the system comprising:

a flash memory device divided into a plurality of individually erasable memory portions;

a designated memory area;

a memory reclamation mechanism configured to copy all valid data from one of the memory portions of the flash memory to the designated memory area, erase the memory portion that was copied, write the valid data from the designated memory area contiguously to the next available free space on the flash memory device, and to repeat the copying, erasing, and writing for each of the plurality of memory portions on the flash memory device in a consecutive order, such that the flash memory device contains no invalid data and contains a plurality of contiguous memory portions which are free;

a pointer configured for keeping track of the address of the next available free space on the flash device, wherein the reclamation mechanism updates the pointer after writing the valid data to the next available free space;

wherein the designated memory area has area a memory capacity at least as large as one of the memory portions, wherein the plurality or memory portions have successive addresses from a first portion to a last portion, wherein the reclamation mechanism is configured to start the copying, erasing, and writing at the first portion and continue without interruption from portion to portion consecutively through the last portion;

wherein the next available free space comprises the next erased location on the flash memory device beginning from the first portion on the device, and wherein the reclamation mechanism contiguously writes the valid from the designated memory area to the next available free space such that all valid data on the flash memory device becomes contiguous on a first contiguous segment of the flash memory device and all free memory on the flash memory device becomes contiguous on a second contiguous segment of the device after reclamation mechanism has repeated the copying, erasing, and writing for each of the portion on the device.

2. The system as recited in claim 1, wherein each of the memory portions comprises a sector and each sector comprises a plurality of individually readable and writable blocks.

3. The system as recited in claim 1, wherein each of the memory portions comprises a sector and each sector comprises a plurality of individually readable and writable blocks, and wherein the system further comprises:

a file management mechanism configured to store files in the flash memory device in both contiguous formats and blocked formats.

4. The system as recited in claim 1, wherein the valid data on the memory area has a file format associated therewith, and wherein the reclamation mechanism is configured to write the valid data to the next available free space in a manner which maintains the file format of the valid data.

5. The system as recited in claim 1, wherein the designated memory area comprises random access memory external to the flash memory device.

6. The system as recited in claim 1, wherein the valid data comprises at least one file, wherein the at least one file includes a pointer for pointing to the address of the next file on the flash memory;

and wherein the reclamation mechanism is configured to update the pointer of the at least one file header after it is written from the memory area to the next available free space.

7. The system as recited in claim 1, wherein valid data comprises a plurality of files, each file being stored in either a contiguous file format or a blocked file format having at least one block, wherein each block of a blocked file includes a pointer which points to the address of the next block for the file, and wherein the reclamation mechanism is configured to update the pointer of each block of a blocked file after it is written to the next available free space.

8. The system as recited in claim 1, wherein the pointer comprises a bitmap saved on the flash memory device for keeping track of the available free space on the device, wherein reclamation mechanism updates the bitmap after writing the valid data to the next available free space.

9. The system as recited in claim 1, wherein each portion comprises a plurality of physical sectors on at least one flash memory chip.

10. The system as recited in claim 1, wherein the designated memory area has a total memory capacity which is less than the total memory capacity of the flash memory device.

11. A method for reclaiming memory filled by invalid data on a flash memory device, comprising:

accessing an individually erasable memory portion of a flash memory device;

copying valid data from the accessed portion to a designated memory area having a memory capacity at least as large as the accessed memory portion and smaller than the total memory capacity of the flash memory device;

erasing the accessed memory portion;

writing the valid data from the designated memory area to the next available free space on the flash memory device such that the valid data is stored contiguously on the next available free space; and repeating the above steps on each successive individually erasable memory portion of the flash memory device, such that the flash memory device contains no invalid data and contains a plurality of contiguous memory portions which are free;

wherein the memory portions have successive addresses from a first portion a last portion, wherein the steps are started at the first portion and repeated on each successive portion through the last portion in a continuous manner, such that all valid data becomes contiguous on a first contiguous on a first contiguous segment of the flash memory and all free space becomes contiguous on a second contiguous segment of the flash memory;

and wherein the writing step comprises:
determining whether a file in the designated memory area is in a blocked format or a contiguous format; and
if the file is in a blocked format, writing all data for the blocked file in the designated memory area to the the flash memory device contiguous at the next available free space.

12. The method as recited in claim 11, further comprising:
after the writing step, updating a pointer mechanism to indicate the location of the next available free space on the flash memory device.

13. The method as recited in claim 11, wherein each memory portion comprises a sector and each sector comprises a plurality of individually readable and writable blocks, the method further comprising:
prior to all other steps:
storing the valid data to the flash memory device in either a contiguous file format or a blocked file format as desired;
when a new file is stored to the flash memory device, updating a file pointer for the previously stored file such that the file pointer points to the address of the new file; and
when a new block of a blocked file is stored to the memory device, updating a block pointer for the previously stored block of the blocked file, such that the block pointer points to the address of the new block.

14. The method as recited in claim 13, wherein the file format is preserved during the writing step.

15. The method as recited in claim 13, further comprising:
when a new block of a blocked file is written from the memory area to the next available free space, updating the block pointer for the block previously written from the memory area to the next available free space for the blocked file, such that the updated block pointer points to the address of the new block written.

16. The method as recited in claim 11, further comprising:
when a new file is written from the memory area to the next available free space, updating a file pointer for the previous file written from the memory area to the next available free space, such that the updated file pointer points to the address of the new file written.

17. The method as recited in claim 11, wherein the writing step further comprises:
if the file is in a contiguous format, writing all data for the contiguous file in the designated memory area to the flash memory device at the next available free space.

18. A computer-readable medium having encoded thereon a method for reclaiming invalid memory on a flash memory device, wherein the flash memory device includes a plurality of individually erasable memory portions ranging from a first portion to a last portion, the method comprising:

accessing the first portion of the flash memory device;

copying valid data from the accessed portion to a designated memory area having a memory capacity at least as large as the accessed portion and smaller than the total memory capacity of the flash memory device;

erasing the accessed memory portion;

writing the valid data from the designated memory area to the next available free space on the flash memory device such that the valid data is stored contiguously on the flash memory device;

after the writing step, updating a pointer mechanism to indicate the location of the next available free space on the flash memory device;

repeating the steps on each successive individually erasable memory portion through the last portion of the flash memory device in a continuous manner, such that no invalid data remains on the flash memory device and such that all valid data becomes contiguous on a first contiguous segment of the flash memory and all free space becomes contiguous on a second contiguous segment of the flash memory;

when a new file is written from the memory area to the next available free space, updating a file pointer for the previous file written from the memory area to the next available free space, such that the file pointer points to the address of the file written;

wherein the writing step comprises:
determining whether a file in the designated memory area is in a blocked format or a contiguous format; and
if the file is in a blocked format, writing all data for the blocked file in the designated memory area to the memory device contiguously at the next available free space.

19. The method as recited in claim 18, wherein the valid data may be in one of a plurality of file formats, and wherein the file format of the valid data is preserved during the writing step.

20. A system for reclaiming memory filled by invalid data on a flash memory device, the system comprising:

an erasable flash memory device in a printer;

a designated memory area in said printer having a memory capacity smaller than the total memory capacity of the flash memory device;

a memory reclamation mechanism in said printer configured to copy all valid data from a portion of the flash memory to the designated memory area, erase the flash memory portion that was copied, write the valid data from the memory area contiguously to the next available free space on the flash memory device, and repeat the copying, erasing, and writing on remaining portions of the flash memory such that no invalid data remains on the flash memory device, all valid data on the flash memory device becomes contiguous, and all free space on the flash memory device becomes contiguous; and a pointer configured for keeping track of the address of the next available free space on the flash device, wherein the reclamation mechanism updates the pointer after writing the valid data to the next available free space;

wherein the designated memory area has a memory capacity at least as large as one of the memory portions, wherein the flesh memory portions have successive addresses from a first portion to a last portion, wherein the reclamation mechanism is configured to start the copying, erasing, and writing at the first portion and continue without interruption from portion consecutively through the last portion;

wherein the next available free space comprises the erased location on the flash memory device beginning from the first portion on the device, and wherein the reclamation mechanism contiguously write the valid data from the designated memory area to the next available free space such that all valid data on the flash memory device becomes contiguous on a first contiguous segment of the flash memory device and all free memory on the flash memory device becomes contiguous on a second contiguous segment of the device after the reclamation mechanism has repeated the copying, erasing, and writing for each of the portions on the device.

* * * * *